(12) United States Patent
Kawahara et al.

(10) Patent No.: US 7,845,391 B2
(45) Date of Patent: Dec. 7, 2010

(54) AIR-CONDITIONING UNIT AND VEHICLE AIR-CONDITIONING APPARATUS

(75) Inventors: Tatsuhide Kawahara, Aichi-ken (JP); Soichiro Fujita, Aichi-ken (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 1275 days.

(21) Appl. No.: 11/005,004

(22) Filed: Dec. 7, 2004

(65) Prior Publication Data

US 2005/0189100 A1 Sep. 1, 2005

(30) Foreign Application Priority Data

Jan. 15, 2004 (JP) ............................. 2004-008559
Jan. 15, 2004 (JP) ............................. 2004-008561
Feb. 17, 2004 (JP) ............................. 2004-039878

(51) Int. Cl.
*B60H 1/00* (2006.01)
(52) U.S. Cl. ............................. 165/42; 165/43; 165/78; 165/134.1; 62/244; 454/156; 296/187.03; 296/187.05
(58) Field of Classification Search ................. 165/202, 165/42, 43, 78, 134.1, 41; 62/244; 454/156, 454/155, 335, 259; 296/187.03–187.13
See application file for complete search history.

(56) References Cited

U.S. PATENT DOCUMENTS

| | | | | |
|---|---|---|---|---|
| 4,478,274 A | * | 10/1984 | Naganoma et al. | 165/204 |
| 4,533,081 A | * | 8/1985 | Forsting et al. | 237/12.3 B |
| 4,887,520 A | * | 12/1989 | Bauer | 454/155 |
| 5,238,453 A | * | 8/1993 | Heil | 454/335 |
| 5,927,382 A | * | 7/1999 | Kokubo | 165/42 |
| 5,980,381 A | * | 11/1999 | McCormick | 454/259 |
| 6,431,257 B1 | | 8/2002 | Sano et al. | |

(Continued)

FOREIGN PATENT DOCUMENTS

EP 0 940 275 A1 9/1999

(Continued)

OTHER PUBLICATIONS

Partial English Translation of Japanese Office Action issued Jul. 25, 2006 in connection with JP 2004-008559.

(Continued)

*Primary Examiner*—John K Ford
(74) *Attorney, Agent, or Firm*—Wenderoth, Lind & Ponack, L.L.P.

(57) ABSTRACT

Sharp bends in a defrost duct extending from a defrost outlet to a windshield, and in a face duct extending from a face outlet to both sides of a front passenger seat, are eliminated and the duct resistance of these ducts is reduced. Moreover collision safety of passengers is improved, and an interior space of a vehicle is expanded forward. In an air-conditioning unit to be positioned to the front of a front seat of a vehicle, an evaporator is positioned below and behind a blower, and a heater core is positioned below and in front of the blower. Preferably the air-conditioning unit is of a crushable structure wherein, in the event of a vehicle collision, a wall of the main cover behind the evaporator is broken, or component parts housed within the main cover are moved, to thereby absorb the impact energy.

7 Claims, 12 Drawing Sheets

U.S. PATENT DOCUMENTS

2002/0129931 A1    9/2002    Nagata et al.
2003/0232591 A1    12/2003   Nanaumi et al.

FOREIGN PATENT DOCUMENTS

| | | |
|---|---|---|
| EP | 1 090 784 A2 | 4/2001 |
| EP | 1 717 076 | 1/2005 |
| EP | 1 555 150 | 7/2005 |
| JP | 57-135411 | 8/1982 |
| JP | 58-133913 | 8/1983 |
| JP | 02-041916 | 2/1990 |
| JP | 8-132852 | 5/1996 |
| JP | 10-058951 | 3/1998 |
| JP | 10-58951 | 3/1998 |
| JP | 10-100655 | 4/1998 |
| JP | 10-297249 | 11/1998 |
| JP | 11-348531 | 12/1999 |
| JP | 2001-080339 | 3/2001 |
| JP | 2001-80343 | 3/2001 |
| JP | 2001-097025 | 4/2001 |
| JP | 2001-105830 | 4/2001 |
| JP | 2001-105831 | 4/2001 |
| JP | 2001-113930 | 4/2001 |
| JP | 2001219736 A * | 8/2001 |
| JP | 2002-301924 | 10/2002 |
| JP | 2003-34114 | 2/2003 |
| JP | 2003-191742 | 7/2003 |

OTHER PUBLICATIONS

Partial English Translation of Japanese Office Action issued Oct. 24, 2006 in connection with JP 2004-008559.

Partial English Translation of Japanese Office Action issued Sep. 19, 2006 in connection with JP 2004-008559.

Communication under Rule 51(4) EPC issued May 5, 2006 in connection with EP 05 290 041.

Communication under Rule 51(4) EPC issued Jul. 25, 2007 in connection with EP 06 118 578.

Partial English Translation of the most recent claims of Japanese Patent Application No. 2004-008559.

Partial English Translation of the most recent claims of Japanese Patent Application No. 2004-008561.

Partial English Translation of the most recent claims of Japanese Patent Application No. 2004-039878.

* cited by examiner

FACE/FOOT MODE

DEFROST/FOOT MODE

AIR-CONDITIONING UNIT AND VEHICLE AIR-CONDITIONING APPARATUS

BACKGROUND OF THE INVENTION

1. Field of the Invention

The present invention relates to an air-conditioning unit and a vehicle air-conditioning apparatus, and more particularly to an air-conditioning unit and vehicle air-conditioning apparatus positioned to the front with respect to the front seat.

This application is based on Japanese Patent Applications No. 2004-8559, filed Jan. 15, 2004, No. 2004-8561, filed Jan. 15, 2004, and No. 2004-39878, filed Feb. 17, 2004, the contents of which are incorporated herein by reference.

2. Description of Related Art

As a conventional air-conditioning unit there is known a so called HVAC (heating, ventilation, and air-conditioning) module is known in which a blower is positioned at the front of and higher in a vehicle, and an evaporator is positioned at the front of and lower in the vehicle, and a heater core is positioned to the rear of and lower than the air-conditioning unit in the vehicle (for example, refer to Japanese Unexamined Patent Application, First Publication No. 2003-34114).

However, as shown in FIG. 16, in the air-conditioning unit 100 disclosed in Japanese Unexamined Patent Application, First Publication No. 2003-34114, a defrost outlet 101 is provided at the top-center of the air-conditioning unit 100, and side face outlets 102 are provided on the top-rear side walls of the air-conditioning unit 100. Therefore, as shown in FIG. 17, there is a problem in that defrost ducts 101a and the face ducts 102a must be bent at sharp angles to reach the required positions, resulting in a dramatic increase in duct resistance of the ducts 101a and 102a.

The reason for bending the face duct 102a in a U-shape as shown in FIG. 17 is the need to avoid an instrument cluster 104 positioned in front of a steering wheel 103 on the driver's side, and the need to avoid an airbag, a dashboard (not shown in drawings), and the like on the passenger's side. Reference symbol WS in FIG. 17 denotes a windshield.

Furthermore, in the air-conditioning unit 100 disclosed in Japanese Unexamined Patent Application, First Publication No. 2003-34114, since the heater core 105 is positioned at the lower rear of the air-conditioning unit 100, that is to say, in the vicinity of the feet (toes) of a passenger sitting in the front seat, if a crack or the like should occur in the heater core 105 or in the hot water piping (not shown in drawings) connected to the heater core 105 and hot water should leak, this leaked hot water may come into direct contact with the feet of the passenger sitting in the front seat.

Moreover, since the heater core 105 is positioned at the rear of the air-conditioning unit 100 (that is to say, on the passenger compartment side), the distance between the radiator mounted in the engine compartment (not shown in drawings) and the heater core 105 is increased, the length of the hot water piping is increased, the hot water piping must be routed to avoid the feet of the passenger sitting in the front seat, and thermal insulation material must be wound around the exposed hot water piping to guard against burns resulting from the feet of the passenger contacting the hot water piping, causing a problem in that the manufacturing process becomes complicated.

Furthermore, in the air-conditioning unit 100 disclosed in Japanese Unexamined Patent Application, First Publication No. 2003-34114, feet outlets 106 are provided in the side walls at the rear-center of the air-conditioning unit 100. Therefore one end of a duct (not shown in drawings) must be connected to this feet outlet 106, and the other end of the duct must be extended to the feet of the passenger sitting in the front seat, so that there are problems in that routing of the duct becomes troublesome, the duct can only extend as far as the vicinity of the ankles and shins of the passenger, and the feet of the passenger cannot be warmed sufficiently.

Moreover, in the air-conditioning unit 100 disclosed in Japanese Unexamined Patent Application, First Publication No. 2003-34114, when a face/feet mode (a mode wherein air is blown from the center face outlet 117, the side face outlet 102 and the feet outlet 106) is selected, the cold air passing through the evaporator 108 flows into (collides with) the warm air W passing through the heater core 105 and along the inner wall surface 107a of a wall 107 and upwards. Therefore cold and warm air are mixed in the vicinity of the area upstream of the feet outlet 106, and air at approximately the same temperature is blown from the face outlet 102 and the feet outlet 106. Therefore there is a problem in that a temperature difference to keep the head cool with cold air blown from the face outlet 102 and the feet warm with warm air blown from the feet outlet 106 is not possible Furthermore, in the air-conditioning unit disclosed in Japanese Unexamined Patent Application, First Publication No. 2003-34114, component parts such as the evaporator and the heater core are housed within the main cover in a rigidly fixed manner, increasing the overall rigidity of the air-conditioning unit. Therefore there is a problem in that, at the time of a vehicle collision, the air-conditioning unit is not readily broken under an impact force, and hence there is insufficient safety in a collision.

Moreover, in the air-conditioning unit 100 disclosed in Japanese Unexamined Patent Application, First Publication No. 2003-34114, a rear feet outlet 114 is provided at the lower rear of the air-conditioning unit 100, and a flow path 115 is provided to guide the air which has been heat-exchanged in the evaporator 108 and/or the heater core 105 to the rear feet outlet 114.

Therefore a wall 116 forming the outside of the main cover, and the wall 107 formed on the front side of this wall 116 and forming the flow path 115 are formed at the rear of the air-conditioning unit 100 (that is to say, on the side opposite the rear face of the audio equipment buried in the center console).

In this manner, a double wall 116 and 107 is formed in front of the audio equipment, and the strength of this part is increased so that even if the audio equipment knocks against it in the event of a vehicle collision, it is not readily broken. If safety in the event of a collision is considered, it is necessary to provide a large distance between the air-conditioning unit 100 and the audio equipment, and immediately following a collision, maintain a distance between the audio equipment and a passenger sitting in the front passenger seat. Therefore there is a problem in that the space between the air-conditioning unit 100 and the audio equipment is wasted, sacrificing the interior space of the vehicle.

BRIEF SUMMARY OF THE INVENTION

The present invention addresses the aforementioned situation, with an object of providing an air-conditioning unit and a vehicle air-conditioning apparatus in which sharp bends can be eliminated in the defrost duct extending from the defrost outlet to the windshield, and in the face duct extending from the face outlet to both sides of the front passenger seat, and wherein the duct resistance of these ducts can be reduced.

Furthermore, it is another object of the present invention to provide an air-conditioning unit and a vehicle air-conditioning apparatus wherein in the event of a traffic accident or the like, the possibility of the feet of a passenger sitting in the front passenger seat contacting the piping, or the like, of the heater core is reduced, and passenger safety can be maintained at a higher level.

Moreover, another object of the present invention is to provide an air-conditioning unit and a vehicle air-conditioning apparatus wherein heat-exchanged air can be directed directly onto the feet of a passenger sitting in the front passenger seat.

Yet another object of the present invention is to provide an air-conditioning unit and a vehicle air-conditioning apparatus-wherein cold air is blown from the face outlet, and warm air is blown from the feet outlet, so that a cool head and warm feet can be obtained in the face/feet mode.

Yet another object of the present invention is to provide an air-conditioning unit and a vehicle air-conditioning apparatus wherein collision safety in the event of a vehicle collision can be improved.

Moreover, yet another object of the present invention is to provide an air-conditioning unit and a vehicle air-conditioning apparatus wherein the gap to the audio equipment buried in the center console can be reduced, and the interior space of the vehicle can be expanded forward, while maintaining the collision safety of a passenger sitting in the front seat.

The present invention employs the following solutions to resolve the aforementioned problems.

A first aspect of the present invention is an air-conditioning unit to be positioned to the front of a vehicle with respect to a front seat of the vehicle, the air-conditioning unit comprising: an air inlet for drawing in external or internal air; an air outlet comprising a defrost outlet, a face outlet, and a feet outlet; a duct which communicates between the air inlet and the air outlet; a blower which is positioned within the duct and which draws in air from the air inlet and blows this air from the air outlet; an evaporator which cools air moved within the duct by the blower; and a heater core which heats air moved within the duct by the blower, wherein the evaporator is positioned below and behind the blower, and the heater core is positioned below and in front of the blower.

According to such an air-conditioning unit, for example, the heater core, in which hot water is recirculated from the radiator via the hot water piping, is to the front of the vehicle, that is to say, it is positioned far from the front seat. Therefore the piping from the engine compartment can be short, and if a traffic accident occurs, the possibility of the feet of passengers sitting in the front seat contacting the piping, or the like, of the heater core is reduced. Hence the safety of the passengers is improved.

In the air-conditioning unit of the aforementioned first aspect, the defrost outlet may be formed to the front of the blower.

According to such an air-conditioning unit, since the defrost outlet is formed to the front of the blower, that is to say, on the windshield side, the need for a sharp bend in the defrost duct guiding the heat-exchanged air from the defrost duct to the windshield is eliminated, and the duct resistance of the defrost duct is reduced.

In the air-conditioning unit of the aforementioned first aspect, the face outlet may be formed to the front of the blower.

According to such an air-conditioning unit, since the face outlet is formed to the front of the blower, that is to say, on the windshield side, the need for a sharp bend in the face duct guiding heat-exchanged air from the face duct to both sides of the front seat is eliminated, and the duct resistance of the face duct is reduced.

In the air-conditioning unit of the aforementioned first aspect, the defrost outlet and the face outlet may be formed to the front of the blower, the face outlet may be formed between the defrost outlet and the blower, and in the duct, a flow path connected to the feet outlet may be formed to the front of the evaporator.

According to such an air-conditioning unit, the cold air having passed through the evaporator, follows the outer circumferential wall of the blower and is guided to the face outlet, and the warm air having passed through the evaporator and heater core, follows the surface of the wall facing the outer circumferential wall of the blower, and is then guided to the feet outlet through the duct connected to the feet outlet formed behind the wall (that is to say, on the front side) facing the outer circumferential wall.

Consequently cold air is blown from the face outlet, and warm air is blown from the feet outlet.

Moreover, since the duct connected to the feet outlet is formed to the front of the evaporator, the feet outlet can be positioned far from the front seat, that is to say, facing the feet (toes) of a passenger sitting in the front seat, and air blown from the feet outlet is blown onto the feet of the passenger.

A second aspect of the present invention is an air-conditioning unit to be positioned to the front of a vehicle with respect to a front seat of the vehicle, the air-conditioning unit comprising: an air inlet for drawing in external or internal air; an air outlet comprising a defrost outlet, a face outlet, and a feet outlet; a duct which communicates between the air inlet and the air outlet; a blower which is positioned within the duct and which draws in air from the air inlet and blows this air from the air outlet; an evaporator which cools air moved within the duct by the blower; and a heater core which heats air moved within the duct by the blower, wherein in the duct, a flow path connected to the feet outlet is formed to the front of the evaporator.

According to such an air-conditioning unit, since the duct connected to the feet outlet is formed to the front of the evaporator, the feet outlet can be positioned far from the front seat, that is to say, facing the feet (toes) of a passenger sitting in the front seat, and air blown from the feet outlet is blown onto the feet of the passenger.

A third aspect of the present invention is an air-conditioning unit to be positioned to the front of a vehicle with respect to a front seat of the vehicle, the air-conditioning unit comprising: an air inlet for drawing in external or internal air; an air outlet comprising a defrost outlet, a face outlet, and a feet outlet; a duct which communicates between the air inlet and the air outlet; a blower which is positioned within the duct and which draws in air from the air inlet and blows this air from the air outlet; an evaporator which cools air moved within the duct by the blower; and a heater core which heats air moved within the duct by the blower, wherein the heater core provided downstream of the evaporator with respect to the movement of air within the duct is positioned to the front of the vehicle with respect to the evaporator.

According to such an air-conditioning unit, the heater core, in which hot water is recirculated from the radiator via the hot water piping, is positioned to the front of the vehicle, that is to say, it is positioned closer to the engine compartment. Therefore the distance between the radiator mounted in the engine compartment and the heater core 14 can be reduced, and the hot water piping 14a can be shortened, and the wasteful detour can be eliminated.

Furthermore, the air-conditioning unit of the first aspect may be provided with a main cover in which the air inlet, the air outlet, and the duct are formed, and a wall of the main cover behind the evaporator may have a crushable structure such that it is broken when an impact is applied, thus absorbing the impact energy.

According to such an air-conditioning unit, in the event of a vehicle collision, audio equipment flying towards (colliding with) the wall of the main cover hits the wall of the main cover due to inertia, so that the wall of the main cover is readily broken, and the energy of the collision is absorbed, and the audio equipment is buried in the wall of the main cover. At this time, since sufficient distance is provided between the audio equipment and the passenger, the passenger is not injured by the audio equipment. Consequently the gap between the audio equipment buried in the center console, and the air-conditioning unit can be reduced, and interior space of the vehicle can be expanded forward.

In the air-conditioning unit wherein the wall of the main cover has a crushable structure, the wall of the main cover may be of single layer construction.

According to such an air-conditioning unit, in the event of a vehicle collision, audio equipment flying towards (colliding with) the wall of the main cover hits the wall of the main cover due to inertia, so that the wall of the main cover is readily broken, and the audio equipment is buried in the wall of the main cover. At this time, since sufficient distance is provided between the audio equipment and the passenger, the passenger is not injured by the audio equipment. Consequently the gap between the audio equipment buried in the center console, and the air-conditioning unit can be reduced, and interior space of the vehicle can be expanded forward.

In the air-conditioning unit wherein the wall of the main cover has a crushable structure, the wall of the main cover may be provided with at least one notch.

According to such an air-conditioning unit, in the event of a vehicle collision, breakage of the wall of the main cover occurs more readily. Therefore, the gap between the audio equipment buried in the center console, and the air-conditioning unit can be further reduced, and interior space of the vehicle can be expanded further forward.

Moreover, in the air-conditioning unit wherein the wall of the main cover has a crushable structure, the main cover may comprise a main left cover, a main right cover, and a main bottom cover smaller in size than left and right covers.

According to such an air-conditioning unit, in the event of a vehicle collision, when audio equipment flying towards (colliding with) the wall of the main cover hits the wall of the main cover due to inertia, the wall of the main cover is readily broken and the main cover disintegrates into three members. Therefore the audio equipment is buried deeply between the disintegrated components of the main cover. Consequently the gap between the audio equipment buried in the center console and the air-conditioning unit can be further reduced, and interior space of the vehicle can be further expanded forward.

A fourth aspect of the present invention is an air-conditioning unit to be positioned to the front of a vehicle with respect to a front seat of the vehicle; inside a main cover in which an air inlet for drawing in external or internal air; an air outlet comprising a defrost outlet, a face outlet, and a feet outlet; and a duct which communicates between the air inlet and the air outlet are formed, the air-conditioning unit comprising: a blower which draws in air from the air inlet and blows this air from the air outlet; an evaporator which cools air moved within the duct by the blower; and a heater core which heats air moved within the duct by the blower, wherein a flow path from the blower to the evaporator is formed between the evaporator and a wall of the main cover behind the evaporator, and wherein a wall on the seat side of the main cover is a crushable face such that equipment adjacent to the main cover is able to move in an area wherein a flow path from the blower to the evaporator is formed, under an impact.

Here, the crushable face may be made of a material, or shaped such as with a notch, or the like, such that the wall is broken preferentially under an impact with the equipment adjacent to the main cover. According to such an air-conditioning unit, a structure is realized wherein audio equipment and the like flying towards (colliding with) the wall of the main cover due to inertia in the event of a vehicle collision, breaks the wall into the space between the formed flow path, thereby absorbing the energy of the collision, and ensuring that the equipment does not rebound towards the passenger.

A fifth aspect of the present invention is an air-conditioning unit to be positioned to the front of a vehicle with respect to a front seat of the vehicle; inside a main cover in which an air inlet for drawing in external or internal air; an air outlet comprising a defrost outlet, a face outlet, and a feet outlet; and a duct which communicates between the air inlet and the air outlet are formed, the air-conditioning unit comprising: a blower which draws in air from the air inlet and blows this air from the air outlet; an evaporator which cools air moved within the duct by the blower; and a heater core which heats air moved within the duct by the blower, wherein component parts housed within the main cover are moved when an impact is applied, and wherein the entire air-conditioning unit is of a crushable structure which absorbs the impact energy.

According to such an air-conditioning unit, when an impact is applied in the event of a vehicle collision, component parts such as the evaporator and heater core housed within the main cover are separated from the main cover due to the impact force, so that the rigidity of the entire air-conditioning unit is reduced, and the air-conditioning unit is crushed and broken particularly in the longitudinal direction of the vehicle.

In the air-conditioning unit of the fifth aspect, the evaporator may be positioned below and behind the blower, and the heater core may be positioned below and in front of the blower.

According to such an air-conditioning unit, when an impact is applied in the event of a vehicle collision, component parts such as the evaporator and heater core housed within the main cover are separated from the main cover due to the impact force, so that the rigidity of the entire air-conditioning unit is reduced, and the air-conditioning unit is crushed and broken particularly in the longitudinal direction of the vehicle.

In the air-conditioning unit of the fifth aspect, guide rails may be provided facing both sides of the heater core, which guide the heater core towards the evaporator when an impact is applied to the inner wall surface of the main cover.

According to such an air-conditioning unit, the heater core is guided reliably and smoothly towards the evaporator by the guide rails, so that in the event of a collision, the air-conditioning unit is able to be broken as designed.

The air-conditioning unit of the fifth aspect may be constructed such that a hinge part of a damper housed within the main cover is broken when an impact is applied.

According to such an air-conditioning unit, when an impact is applied in the event of a vehicle collision, the damper housed within the main cover is separated from the main cover due to the impact so that the rigidity of the entire air-conditioning unit is reduced.

In the air-conditioning unit of the fifth aspect, at least one notch may be provided in a wall of the main cover.

According to such an air-conditioning unit, the wall of the main cover is readily cracked due to the notch, so that the wall of the main cover is readily breakable when an impact is applied in the event of a vehicle collision.

Moreover, at the time of a vehicle collision, colliding objects such as audio equipment positioned to the rear of the vehicle in relation to the air-conditioning unit, and flying towards (colliding with) the wall of the main cover due to inertia enter the space forming the duct formed within the main cover, so that the impact energy is absorbed, and rebounding of impact objects such as the audio equipment towards the passgengers is prevented.

In the air-conditioning unit of the fifth aspect, the main cover may comprise a main left cover and a main right cover.

According to such an air-conditioning unit, the main cover is readily separated in two by collision of objects (for example, audio equipment) with the joining face (the contact face between the main left cover and main right cover) of the main cover from the outside. Therefore the air-conditioning unit is more readily broken.

The vehicle air-conditioning apparatus of the present invention comprises: an air-conditioning unit according to any of the aforementioned first through third aspects; a refrigeration system comprising a compressor which compresses a gaseous refrigerant, a condenser which exchanges heat between the gaseous refrigerant under a high pressure and external air, and thus condenses the gaseous refrigerant, and an expansion valve which converts a high-temperature high-pressure liquid refrigerant into a low-temperature low-pressure liquid refrigerant, to supply the low-temperature and low-pressure liquid refrigerant to the evaporator; a heat source system which introduces engine cooling water to the heater core, and a control unit which controls operation of the air-conditioning unit, the refrigeration system and the heat source system.

According to such a vehicle air-conditioning apparatus, it is furnished with an air-conditioning unit wherein safety is improved, or an air-conditioning unit wherein the duct resistance of the defrost duct and/or the face duct is reduced, or an air-conditioning unit wherein air can be blown directly from the feet outlet onto the feet of a passenger sitting in the front seat, or an air-conditioning unit wherein it is possible to realize a cool head and warm feet in the face/feet mode.

Alternatively, the vehicle air-conditioning apparatus of the present invention comprises: the air-conditioning unit of the first aspect with a wall of the main cover having a crushable structure, or an air-conditioning unit according to the fourth aspect; a refrigeration system comprising a compressor which compresses a gaseous refrigerant, a condenser which exchanges heat between the gaseous refrigerant under a high pressure and external air, and thus condenses the gaseous refrigerant, and an expansion valve which converts a high-temperature high-pressure liquid refrigerant into a low-temperature low-pressure liquid refrigerant, to supply the low-temperature and low-pressure liquid refrigerant to the evaporator; a heat source system which introduces engine cooling water to the heater core, and a control unit which controls operation of the air-conditioning unit, the refrigeration system and the heat source system.

According to such a vehicle air-conditioning apparatus, an air-conditioning unit having superior collision safety for passengers sitting in the front seat is provided.

Alternatively, the vehicle air-conditioning apparatus of the present invention comprises: the air-conditioning unit according to the fifth aspect; a refrigeration system comprising a compressor which compresses a gaseous refrigerant, a condenser which exchanges heat between the gaseous refrigerant under a high pressure and external air, and thus condenses the gaseous refrigerant, and an expansion valve which converts a high-temperature high-pressure liquid refrigerant into a low-temperature low-pressure liquid refrigerant, to supply the low-temperature and low-pressure liquid refrigerant to the evaporator; a heat source system which introduces engine cooling water to the heater core; and a control unit which controls operation of the air-conditioning unit, the refrigeration system and the heat source system.

According to such a vehicle air-conditioning apparatus, an air-conditioning unit having superior collision safety for passengers sitting in the front seat or rear seat is provided.

According to any of the aforementioned first through third aspects of the present invention, sharp bends in the defrost duct and face duct can be eliminated, and duct resistance of these ducts can be reduced.

Furthermore, since the length of the piping from the engine compartment can be reduced, then in the event of a traffic accident, the possibility of the heater core contacting the feet of the passengers sitting in the front seat can be reduced, and passenger safety can be further improved.

Moreover, heat-exchanged air can be directed directly onto the feet of the passengers sitting in the front seat.

Furthermore, in the face/feet mode, cold air can be blown from the face outlet, and warm air can be blown from the feet outlet, so that it is possible to keep the head cool and the feet warm.

According to the air-conditioning unit having the wall of the main cover of a crushable structure in the air-conditioning unit of the first aspect of the present invention, or according to the air-conditioning unit of the fourth aspect, the gap to the audio equipment buried in the center console can be reduced, and interior space of the vehicle can be expanded forward, while maintaining the collision safety of passengers sitting in the front seat.

According to the air-conditioning unit of the fifth aspect of the present invention, when an impact is applied in the event of a vehicle collision, component parts such as the evaporator and heater core housed within the main cover are separated from the main cover due to the impact force, so that the rigidity of the entire air-conditioning unit is reduced. Therefore at the time of a vehicle collision, the air-conditioning unit can be crushed and broken particularly in the longitudinal direction of the vehicle, and collision safety can be improved.

DETAILED DESCRIPTION OF THE INVENTION

Hereunder is a description of embodiments of a vehicle air-conditioning apparatus according to the present invention, with reference to the drawings.

First Embodiment

Figure 7:
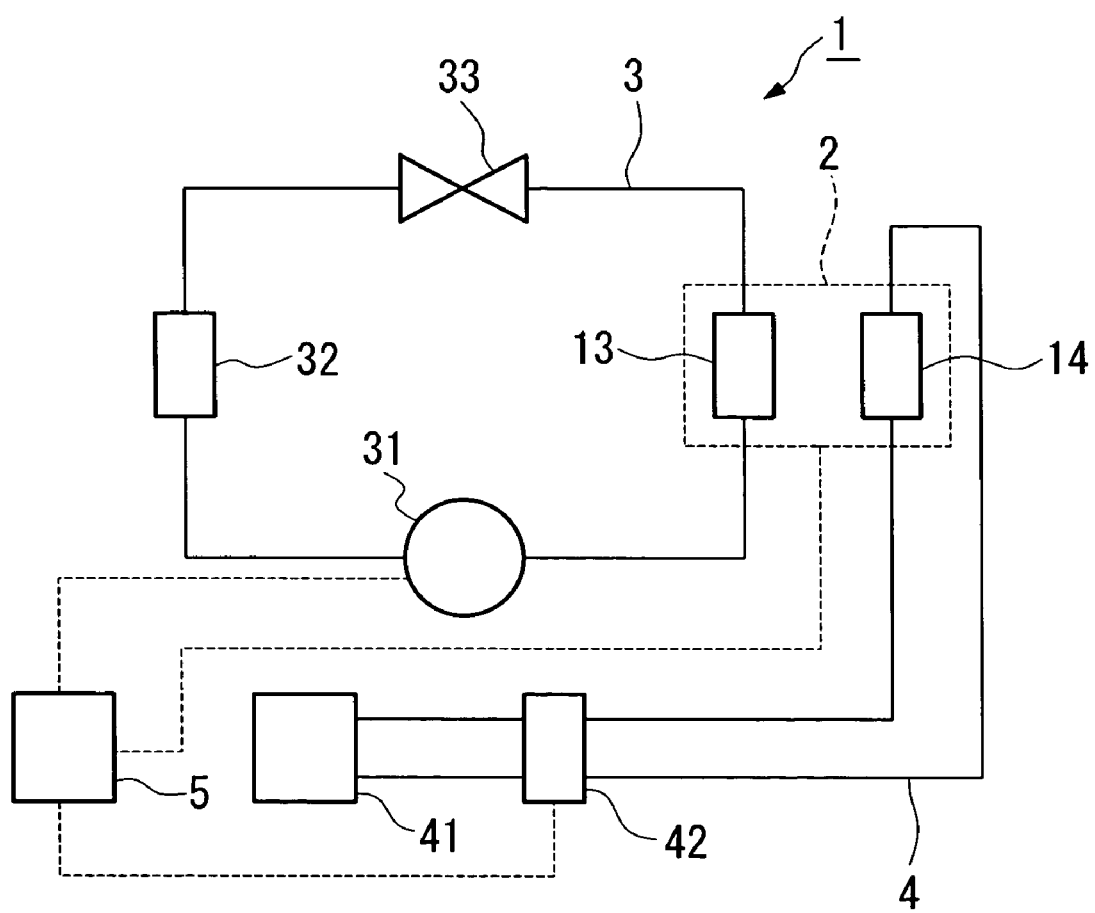
FIG. 7 is a block diagram showing the configuration of a vehicle air-conditioning apparatus in outline.

FIG. 7 is a block diagram showing the configuration of a vehicle air-conditioning apparatus 1 in outline. The vehicle air-conditioning apparatus 1 broadly comprises; an air-conditioning unit 2 for air-conditioning such as cooling and heating, a refrigerant system 3 which supplies refrigerant to the air-conditioning unit 2 during cooling operation, a heat source system 4 which supplies engine cooling water being the heat source, to the air-conditioning unit 2 during heating operation, and a control unit which controls operation of the entire apparatus.

Figure 1:
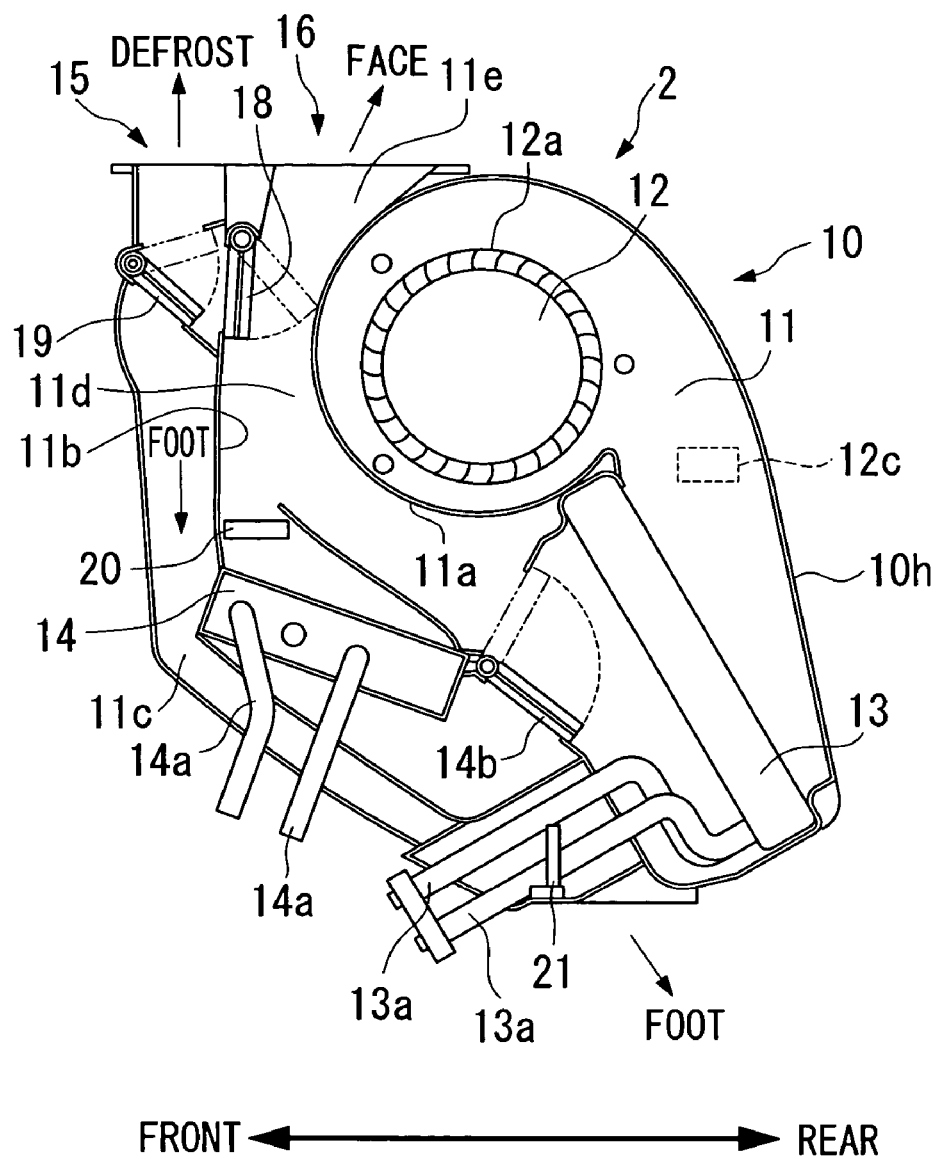
FIG. 1 is a view showing first and second embodiments of an air-conditioning unit according to the present invention, being a partial sectional side view showing an aspect of a duct and dampers within the air-conditioning unit.
Figure 2:
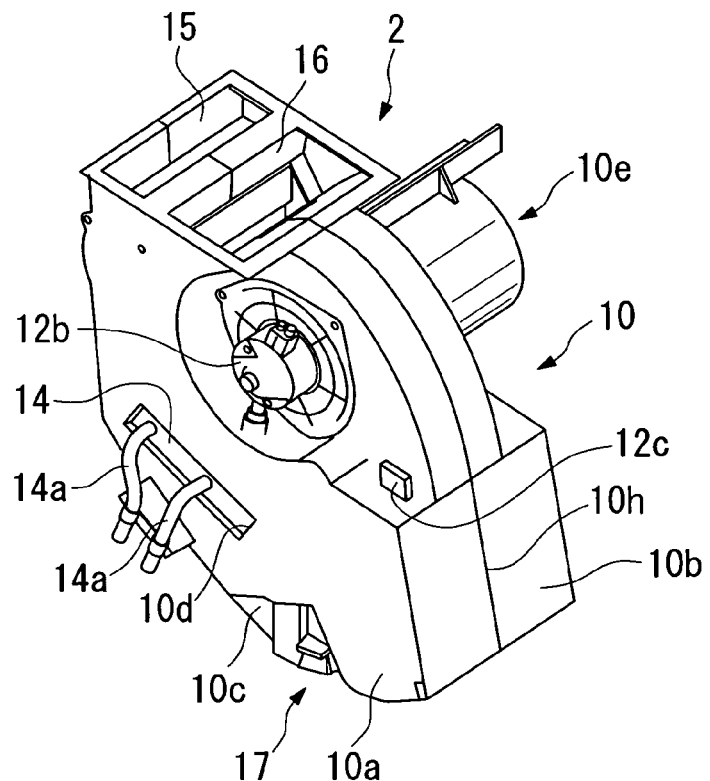
FIG. 2 is an overall perspective view of the first and third embodiments of the air-conditioning unit as seen from the top-left-rear.
Figure 3:
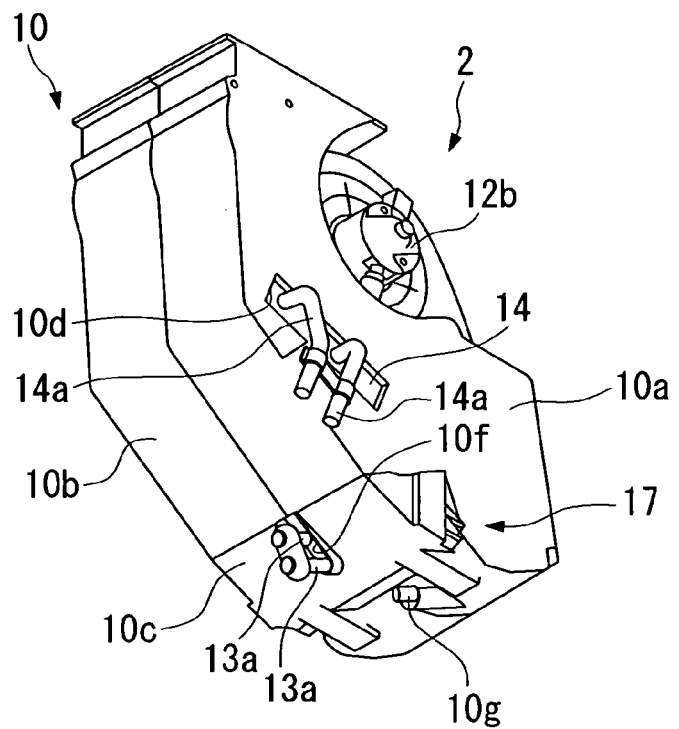
FIG. 3 is an overall perspective view of the air-conditioning unit shown in FIG. 1 as seen from the bottom-left-front.
Figure 4:
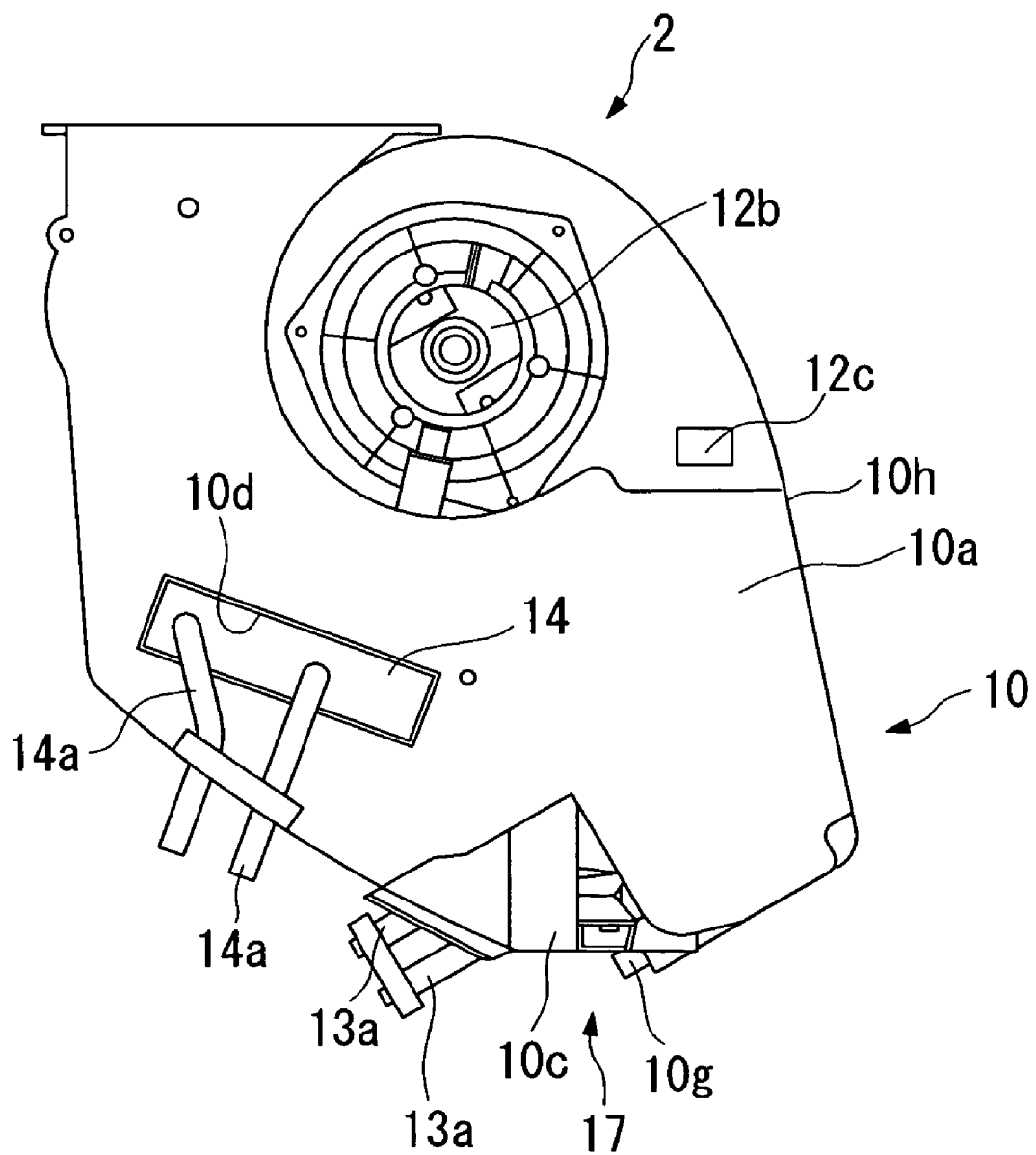
FIG. 4 is a left-side view of the air-conditioning unit shown in FIG. 1.
Figure 5:
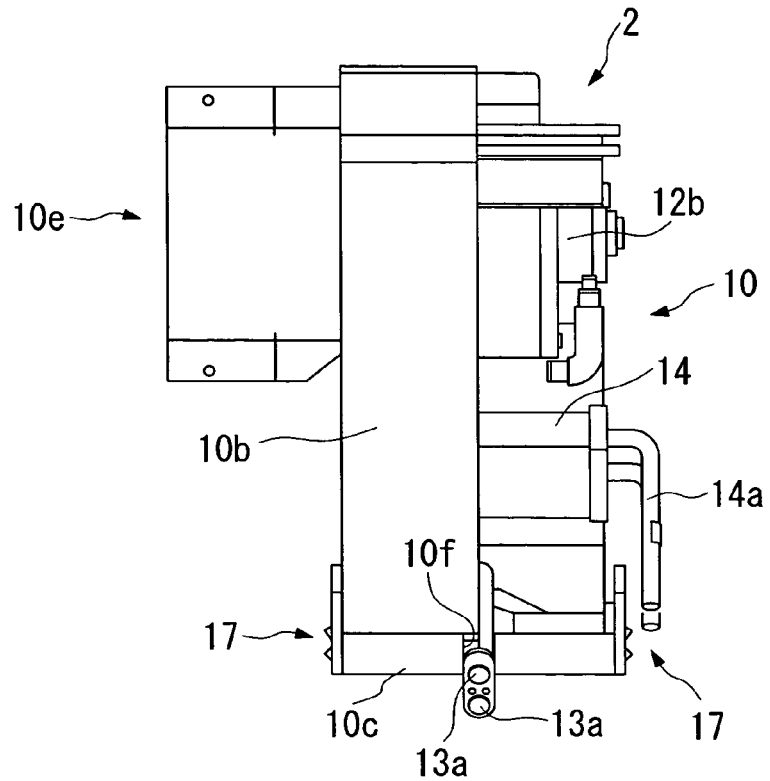
FIG. 5 is a front view of the air-conditioning unit shown in FIG. 4 as seen from the left with a main left cover removed.

FIG. 2 is an overall perspective view of the air-conditioning unit 2 as seen from the top-left-rear, FIG. 3 is an overall perspective view of the air-conditioning unit 2 as seen from the bottom-left-front, FIG. 4 is a left-side view of the air-conditioning unit 2, FIG. 5 is a front view of the air-conditioning unit 2 shown in FIG. 4 as seen from the left with a main left cover removed, and FIG. 1 is the same view as FIG. 4, being a partial sectional side view showing an aspect of a duct and dampers within the air-conditioning unit 2 and a reference direction, showing "FRONT" and "REAR" of the vehicle, for describing HVAC structure later.

As shown in FIG. 1 through FIG. 5, this air-conditioning unit 2 is a so called HVAC (heating, ventilation, and air-conditioning) module comprising as the primary elements; a main cover 10, a blower 12, an evaporator 13, and a heater core 14.

The main cover 10 comprises a main left cover 10a, a main right cover 10b, and a main bottom cover 10c. The exterior of the air-conditioning unit 2 is formed by combining the main left cover 10a, the main right cover 10b, and the main bottom cover 10c, and houses the blower 12, the evaporator 13, the heater core 14, the dampers, and the like described below.

An opening 10d is formed in the center of the front of the main left cover 10a (that is to say, on the engine compartment side) for allowing the hot water piping 14a to be connected to the heater core 14. Moreover, a drive section described below (for example, an electric motor) 12b is fitted to the outside of the main left cover 10a at its top-center, and a resistor (a resistor to control the rpm of the drive section 12) 12c is fitted to the rear of the drive section 12b (that is to say, on the passenger compartment side).

An external air inlet (air inlet) and internal air inlet (air inlet) 10e for drawing in external air and internal air are formed at the top-center of the main right cover 10b, that is to say, at a position facing the drive section 12b fitted to the main left cover 10a.

An opening part 10f through which the refrigerant piping 13a connected to the evaporator 13 is passed is provided at the front-center of the main bottom cover 10c. A drain hole 10g for discharging drain water formed from frost melted from the evaporator 13 and the refrigerant piping 13a, to the exterior of the case, is provided at the rear-center of the main left cover 10a.

Furthermore, feet outlets 17 are provided at the center on both sides of the main bottom cover 10c to blow air downwards (that is to say, onto the feet of a passenger sitting in the front seat).

A duct 11 as shown in FIG. 1 is formed by combining the main left cover 10a and the main right cover 10b. This duct 11 communicates between the external air inlet (air inlet) and internal air inlet (air inlet) 10e, and the defrost outlet 15 which blows air drawn in from these inlets towards the windshield WS (see FIG. 8), the face outlet 16 which blows air towards the face, hands, and chest of the passenger, and the feet outlet 17 (see FIG. 2 through FIG. 5) which blows air towards the feet of the passenger.

The blower 12, is for example, a sirocco fan, and comprises primarily a fan 12a and a drive section (see FIG. 2 through FIG. 5). The fan 12a of this blower 12 is turned by the power from the drive section 12b (positioned inwards from the plane of FIG. 1), and blows air drawn in from the external air inlet (air inlet) and internal air inlet (air inlet) 10e through at least one of the defrost outlet 15, the face outlet 16, and the feet outlet 17.

Here, in the present embodiment, a configuration where the blower 12 is positioned above the evaporator 13 and the heater core 14 (a so called "vertical type") is shown. However the present invention is not restricted to this configuration, and the blower 12 may be positioned to the side of the evaporator 13 (in the width direction of the vehicle), sending air to the evaporator 13 via a duct or the like (a so called "horizontal type").

Figure 6:
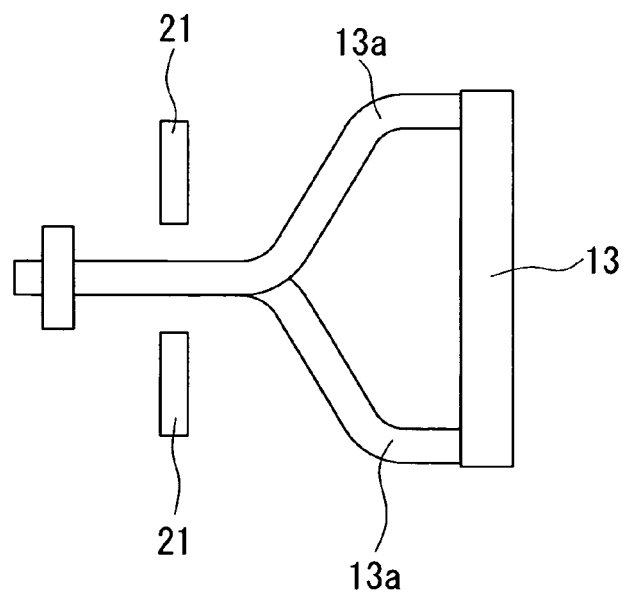
FIG. 6 is a view of the air-conditioning unit shown in FIG. 1 and FIG. 4 as seen from below with a main bottom cover removed showing an evaporator and coolant piping from below.

The evaporator 13 cools air blown from the fan 12a, and is positioned behind and below the blower 12. Moreover, as is apparent from FIG. 6 showing the evaporator 13 and the refrigerant piping 13a from below with the main bottom cover 10c removed, the two refrigerant pipes 13a which extend forward from both sides of the evaporator 13 are each bent and bundled together at the center in the width direction of the air-conditioning unit 2, and bent so that they extend forward.

Furthermore, the heater core 14 positioned on the downstream side of this evaporator 13 heats air blown from the fan 12a, and is positioned in front of and below the blower 12, and in front of the evaporator 13.

An air mixing damper 14b with adjustable opening is provided on the upstream side of the heater core 14 (that is to say, the evaporator 13 side). By setting this air mixing damper 14b to fully open as shown by the two-dot chain line in FIG. 1, in the heating mode, all air blown from the fan 12a of the blower 12 passes through the heater core 14, and by setting it to fully closed as shown by the solid line in FIG. 1, in the cooling mode, all air blown from the fan 12a of the blower 12 bypasses the heater core 14.

Moreover, this air mixing damper 14b may be used at a position intermediate between fully open and fully closed. That is to say, by adjusting the opening of this air mixing damper 14b, the mixing ratio of air bypassing the heater core 14 and passing through the heater core 14 can be varied, to obtain various air temperatures.

At the inlets of the defrost outlet 15 and the face outlet 16 (that is to say, at the front of the blower 12), a damper 18 is provided common to the outlets 15 and 16, and by moving this damper 18, air is blown from the defrost outlet 15 and/or the face outlet 16.

On the other hand, at the inlets of the defrost outlet 15 and the feet outlet 17 a damper 19 is provided common to the outlets 15 and 17, and by moving this damper 19, air can be blown from the defrost outlet 15 and/or the feet outlet 17.

That is to say, when the damper 18 is in the position shown by the solid line in FIG. 1, air is blown only from the face outlet 16, and when it is in the position shown by the two-dot chain line, air is blown from the defrost outlet 15 and/or the feet outlet 17.

Next is a brief description of the refrigerant system 3, based on FIG. 7. This refrigerant system 3 supplies low-temperature and low-pressure liquid refrigerant to the evaporator 13, and is provided with a compressor 31, a condenser 32, and an expansion valve 33.

The compressor 31 compresses the low-temperature and low-pressure gaseous refrigerant evaporated by absorption of the heat of the passenger compartment by the evaporator 13, and sends it to the condenser 32 as high-temperature and high-pressure gaseous refrigerant. In the case of the vehicle air-conditioning apparatus, the compressor 31 is normally driven by the engine 41 via a belt and a clutch.

The condenser 32 is positioned at the front of the engine compartment, and cools the high-temperature and high-pressure gaseous refrigerant supplied from the compressor 31 with the external air, and condenses the gaseous refrigerant to a liquid. This liquefied refrigerant is sent to a receiver (not shown in drawings) where vapor and liquid are separated, and is then sent to the expansion valve 33 as high-temperature and high-pressure liquid refrigerant. A low-temperature and low-pressure liquid (mist) refrigerant is formed by reducing the pressure and expanding the high-temperature and high-pressure liquid refrigerant in this expansion valve 33, and is supplied to the evaporator 13.

Next, is a brief description of the configuration of the heat source system 4, based on FIG. 7. This heat source system 4 supplies high-temperature engine cooling water as the heat source to the heater core 14, and introduces part of the water in the engine cooling system which recirculates water between the engine 41 and the radiator 42, to the heater core 14 with a water valve (not shown in drawings) for flow control.

Finally, is a brief description of the control unit 5, based on FIG. 7. This control unit 5 controls operation of the air-conditioning unit 2, the coolant system 3, and the heat source system 4, constituting the air-conditioning device 1, and normally incorporates a control circuit in the operation panel from which the passenger enters the various settings, and is positioned at the center of the instrument panel. By means of the control unit 5, selective switching of the various operating modes (modes such as cooling, heating, defrost, vent, defrost/feet, and bi-level (face/feet (hereafter referred to as 'B/L')) by opening and closing the air mixing dampers 14b, 18, and 19, switching of the interior/exterior air switching damper, switching of the blower 12 discharge amount, setting of the required temperature, and so on, can be carried out.

Next is a description of the operation of the vehicle air-conditioning apparatus 1, using FIG. 1. This description covers only the defrost/feet mode and the B/L mode.

First is a description of the B/L mode. The air mixing damper 14b is set to a position intermediate between fully open (the position indicated by the solid line in FIG. 1) and fully closed (the position indicated by the two-dot chain line in FIG. 1), and when the operator sets the operating mode switching device provided in the control unit 5 of the vehicle air-conditioning apparatus 1 to the B/L mode, the damper 18 is moved to a position between the position of the solid line and the position of the two-dot chain line in FIG. 1, and the damper 19 is moved to the position of the two-dot chain line, by means of a damper operating device such as a link mechanism or solenoid actuator.

Then the air drawn in from the air inlet 10e by rotation of the fan 12a of the blower 12 passes through the fan 12a and reaches the evaporator 13. The air reaching the evaporator 13 is cooled while passing through the evaporator 13.

By setting the air mixing damper 14b to approximately half-open, part of the cold air passing through the evaporator 13 reaches the heater core 14, and the air reaching the heater core 14 is heated while passing through the heater core 14.

The cold air passing through the evaporator 13 flows along the side of the inner wall surface 11a of the duct 11 forming the outer circumferential wall of the blower 12, passes through the face outlet 16 and is blown towards the face, hands and chest of the passenger. Furthermore, the warm air passing through the heater core 14 flows along the inner wall surface 11b towards the inner wall surface 11a, and after passing through the flow path 11c in front, passes through the feet outlet 17 and is blown towards the feet (toes) of the passenger.

That is to say, in the B/L mode, cold air is blown from the face outlet 16 towards the face, hands, and chest of the passenger, and warm air is blown from the feet outlet 17 towards the feet of the passenger.

Next is a description of the defrost/feet mode. The air mixing damper 14b is set to a position intermediate between fully open (the position indicated by the solid line in FIG. 1) and fully closed (the position indicated by the two-dot chain line in FIG. 1), and when the operator sets the operating mode switching device provided in the control unit 5 of the vehicle air-conditioning apparatus 1 to the defrost/feet mode, the damper 18 is moved to the position of the two-dot chain line in FIG. 1, and the damper 19 is moved to a position between the position of the solid line and the position of the two-dot chain line in FIG. 1, by means of the damper operating device.

Then the air drawn in from the air inlet 10e by rotation of the fan 12a of the blower 12 passes through the fan 12a and reaches the evaporator 13. The air reaching the evaporator 13 is cooled while passing through the evaporator 13.

The main flow of the cold air passing through the evaporator 13 flows along the side of the inner wall surface 11a of the duct 11 forming the outer circumferential wall of the blower 12, and is mixed with the warm air flowing from the inner wall surface 11b side in the area in proximity to the damper 18. The mixed air passes through the defrost outlet 15 and is blown towards the vehicle windshield, and through the feet outlet 17 towards the feet of the passenger.

That is to say, in the defrost/feet mode, air at approximately the same temperature is blown from the defrost outlet 15 towards the windshield, and from the feet outlet 17 towards the feet of the passenger.

Figure 8:
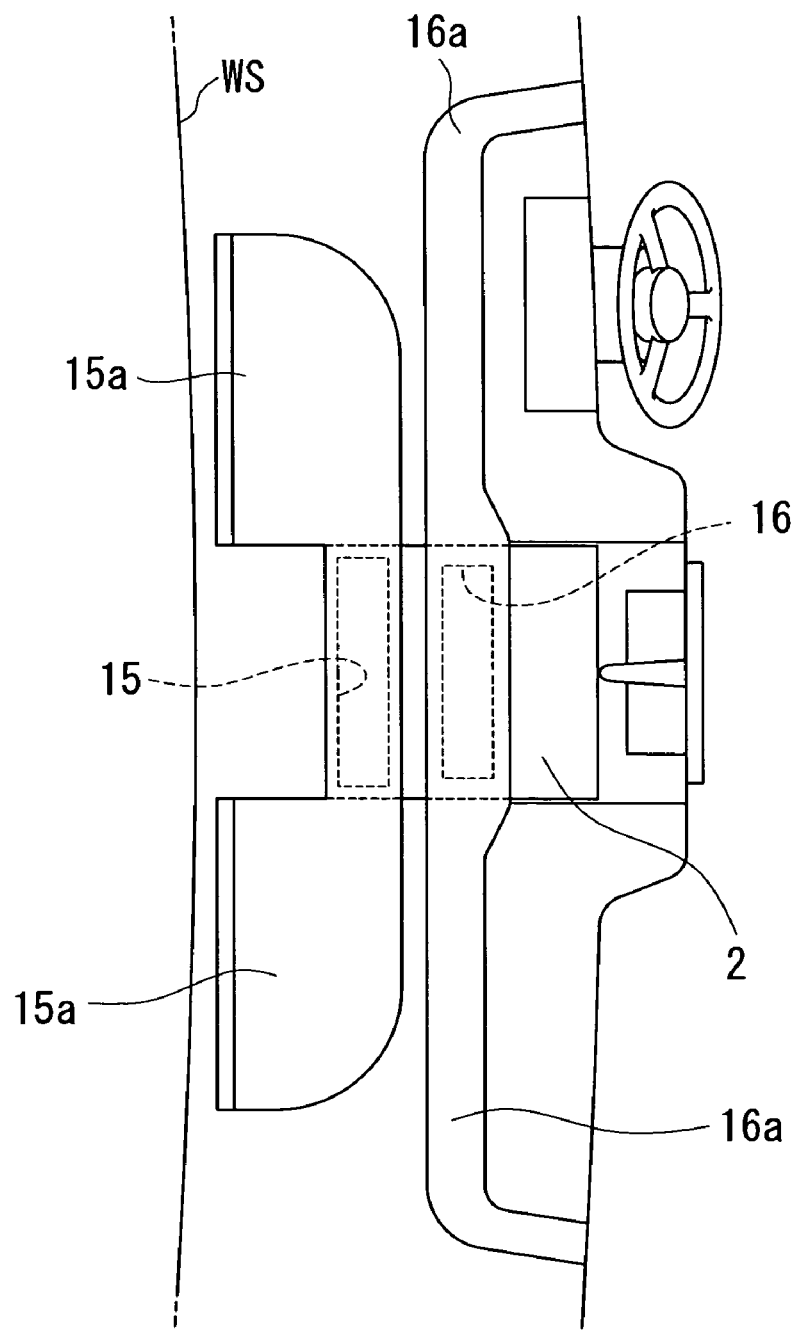
FIG. 8 is a view of the air-conditioning unit shown in FIG. 1 through FIG. 6 as mounted in a vehicle.

In this manner, by providing a defrost outlet 15 and a face outlet 16 from the front of the vehicle (that is to say, the windshield WS side) on the front-top face of the air-conditioning unit 2, the need for sharp bends to bring the defrost duct 15a and face duct 16a to the required positions, as is conventionally the case, is eliminated, and the ducts can be brought directly to the required position as shown in FIG. 8. Therefore the duct resistance of the ducts 15a and 16a can be reduced in comparison to the conventional case.

Furthermore, since the flow path 11c of the duct 11 from the damper 19 to the feet outlet 17 is formed in the front of the air-conditioning unit 2, and the feet outlet 17 is formed forward of the evaporator 13, the air blown from the feet outlet 17 can be directed directly onto the feet of a passenger sitting in the front seat.

In greater detail, the air flow path from the blower 12 to the evaporator 13 is formed to the rear of the vehicle, being the seat side of the evaporator 13 inside the air-conditioning unit 2, and the area wherein the air passing through the evaporator 13 mixes with the air passing through the heater core 14 positioned to the front of the vehicle, is formed along the wall on the vehicle front side of the blower 12. Therefore the defrost outlet 15 and the face outlet 16 can be provided adjacent to the vehicle front-top face of the air-conditioning unit 2.

Moreover, by adopting a simple configuration where the flow path from the aforementioned area wherein the air is mixed is folded down and along the vehicle front side of the air-conditioning unit 2, a feet outlet opening in a direction along the wall forming the space within the passenger compartment can be provided to reliably supply conditioned air to the feet.

Furthermore, since the heater core 14 is positioned forward of the air-conditioning unit 2 (that is to say, on the engine compartment side), the distance between the radiator mounted in the engine compartment and the heater core 14 can be reduced, and the hot water piping 14a can be shortened, and the wasteful detour can be eliminated.

Furthermore, since the heater core 14 is positioned to the front of the air-conditioning unit 2 (that is to say, on the side separated from the feet of the passengers sitting in the front seat), in the event of a traffic accident, the possibility of the feet of the passengers sitting in the front seat contacting the heater core can be reduced, and the safety of the passenger can be further improved. Moreover, even if a crack occurs in the heater core 14 or the hot water piping 14a and hot water leaks, direct contact of the leaked hot water with the feet of the passenger sitting in the front seat can be prevented.

Furthermore, by positioning the evaporator 13 at the rear of the air-conditioning unit 2 (that is to say, on the passenger compartment side), and housing the refrigerant piping 13a within the main cover 10, the refrigerant piping 13a is not visible from the outside and thus appearance can be improved. Moreover, the need to cover the refrigerant piping 13a with thermal insulation material is eliminated, and the number of manufacturing processes can be reduced. Furthermore, manufacturing cost can be reduced.

Moreover, since the drain hole 10g is provided at the front of the main left cover 10a, that is to say, below the downstream side of the evaporator 13 (on the low-pressure side), the occurrence of abnormal noises such as the noise associated with discharge of the condensed water (a bubbling sound) which occurs when provided on the upstream side (the high-pressure side) can be prevented.

Furthermore, in the B/L mode (damper 18 at the intermediate position and damper 19 at the position of the two-dot chain line in FIG. 1, that is to say, the mode wherein air is blown from the face outlet 16 and feet outlet 17), cold air passing through the evaporator 13 flows along the inner wall surface 11a of the duct 11 forming the outer circumferential wall of the blower 12, and warm air passing through the heater core 14 flows along the inner wall surface 11b opposite the inner wall surface 11a, and is then guided to the flow path 11c of the forward duct 11.

Figure 9:
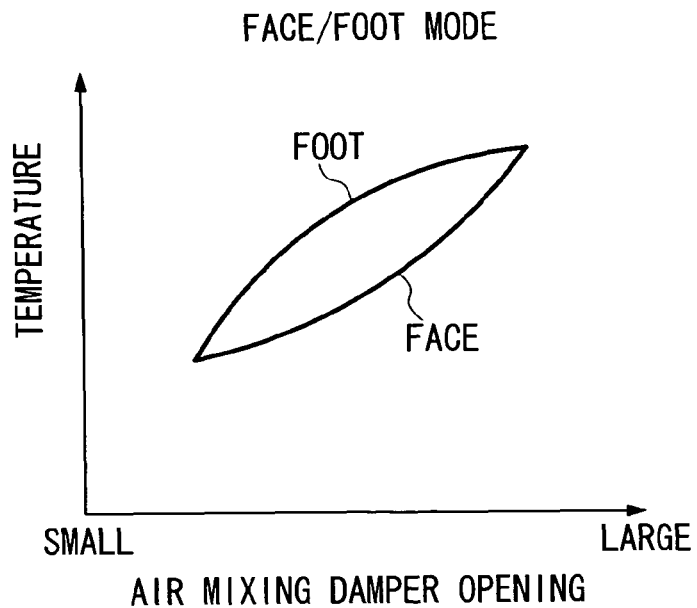
FIG. 9 is a graph showing the relationship between air mixing damper opening and temperature of air blown from the face outlet and feet outlet, obtained with the air-conditioning unit according to the present invention set in the face/feet mode.

That is to say, a layer of cold air on the side of the inner wall surface 11a, and a layer of warm air on the side of the inner wall surface 11b, are formed within the flow path 11d formed by the inner wall surface 11a and the inner wall surface 11b. These two layers do not mix completely and are guided respectively to the face outlet 16 and the feet outlet 17, and as shown in FIG. 9, cold air can be blown from the face outlet 16 towards the face, hands, and chest of the passenger, and warm air can be blown from the feet outlet 17 towards the feet of the passenger, so that a cool head and warm feet can be realized.

Moreover, in the defrost/feet mode (air mixing damper 14b at the intermediate position and damper 18 at the position of the two-dot chain line in FIG. 1, and damper 19 at the intermediate position, that is to say, the mode wherein air is blown from the defrost outlet 15 and the feet outlet 17), the cold air passing through the evaporator 13 flows along the inner wall surface 11a of the duct 11 forming the outer circumferential wall of the blower 12, and then flows along the face of the wall under the damper 18, and is guided to the defrost outlet 15 and the feet outlet 17. However in this case, the warm air passing through the heater core 14 flows from below towards this cold air, and cold air and warm air are mixed in the area in proximity to the damper 18. The mixed air is blown through the defrost outlet 15 towards the vehicle windshield WS, and is blown through the feet outlet 17 towards the feet (the toes) of the passenger.

Figure 10:
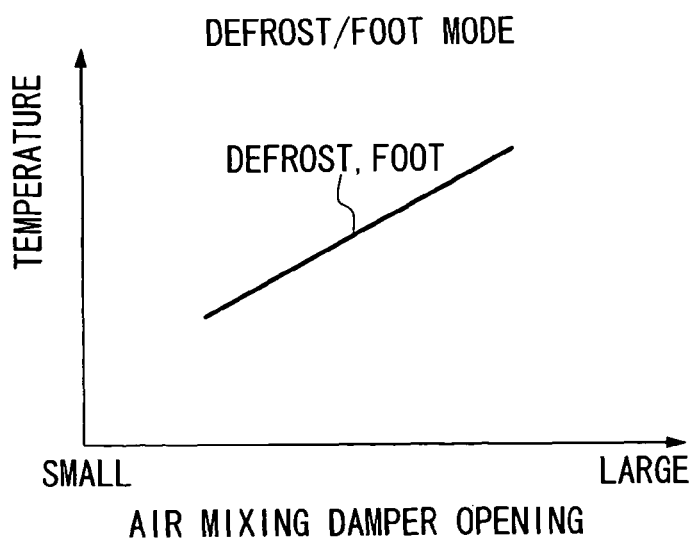
FIG. 10 is a graph showing the relationship between air mixing damper opening and temperature of air blown from the defrost outlet and feet outlet, obtained with the air-conditioning unit according to the present invention set in the defrost/feet mode.

That is to say, when air is guided from the flow path 11d to the defrost outlet 15 and the feet outlet 17, it is guided to the defrost outlet 15 and the feet outlet 17 after sufficient mixing of cold air and warm air in the area in the vicinity of the damper 18, and as shown in FIG. 10, air at the same temperature can be blown from the defrost outlet 15 towards the windshield WS, and from the feet outlet 17 towards the feet of the passenger.

Moreover, in the face mode (the air mixing damper 14b at the intermediate position and the damper 18 at the position of the solid line in FIG. 1, that is to say, the mode wherein air is blown only from the face outlet 16), the flow path 11e to the face outlet 16 is formed so that it is routed around the blower 12, and the flow path 11e can be long. Therefore the cold air flowing along the inner wall surface 11a of the duct 11, and the warm air flowing along the inner wall surface 11b can be sufficiently mixed, non-uniformities in temperature in the air blown from the face outlet 16 can be eliminated, and air of a uniform temperature can be supplied to the passenger compartment.

Moreover, since the register 12c is positioned at the rear (that is to say, on the passenger compartment side), the register 12c can be readily fitted and removed.

Furthermore, the main cover 10 comprises the main left cover 10a, the main right cover 10b, and the main bottom cover 10c, and the wall 10h on the rear side of the air-conditioning unit 2 (that is to say, the side facing the rear face of the audio equipment buried in the center console) is the only wall forming the exterior of the main cover (that is to say, a single-layer construction). Therefore in the event of a vehicle collision, when audio equipment flying towards (colliding with) the wall 10h of the main cover 10 due to inertia hits the wall 10h of the main cover 10, the wall 10h of the main cover 10 is readily broken, and the main cover 10 disintegrates into three components (that is to say, the main left cover 10a, the main right cover 10b, and the main bottom cover 10c). Hence, the audio equipment is buried deeply between the disintegrated components being the main covers 10a, 10b, and 10c. Consequently, the gap between the audio equipment buried in the center console, and the air-conditioning unit 2 can be reduced, and the interior space of the vehicle can be expanded forward.

In the aforementioned embodiment, further suitability is ensured by provision of, for example, auxiliary heat sources 20 and 21 such as PTC (Positive Temperature Coefficient) heaters in the vicinity downstream of the heater core 14 (outlet), and/or the vicinity upstream of the feet outlet 17.

Providing auxiliary heat sources 20 and 21 allows use in cold regions.

Moreover, the auxiliary heat source 21 provided in the upstream vicinity of the feet outlet 17 is incorporated into the interior of the main bottom cover 10c. As shown in FIG. 6, further suitability is ensured by positioning the auxiliary heat source 21 at both sides of the position wherein the refrigerant piping 13a is bundled together.

By positioning the auxiliary heat source 21 at such a position, maintenance of the auxiliary heat source 21 can be performed by simply removing the main bottom cover 10c, and efficiency of work can be improved.

Second Embodiment

Figure 11:
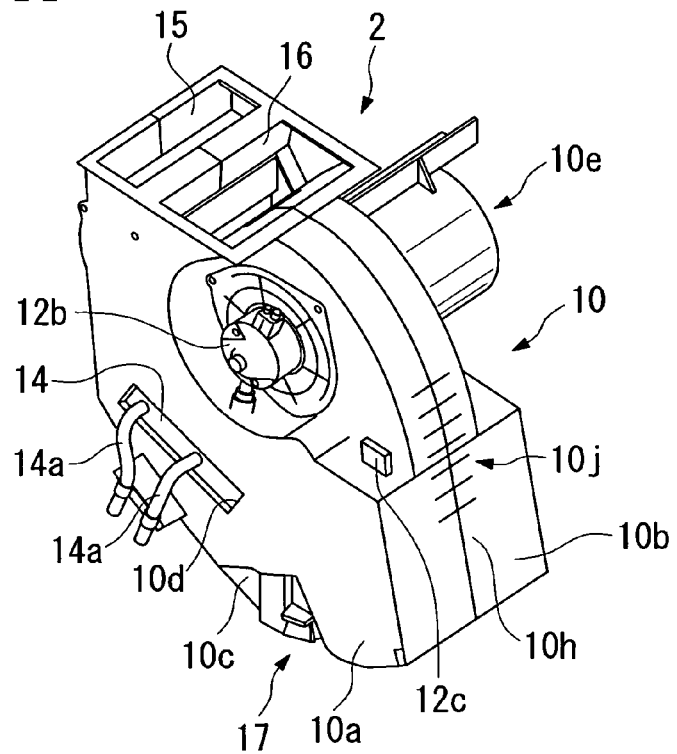
FIG. 11 is an overall perspective view of an air-conditioning unit of a second embodiment as seen from the top-left-rear.
Figure 12:
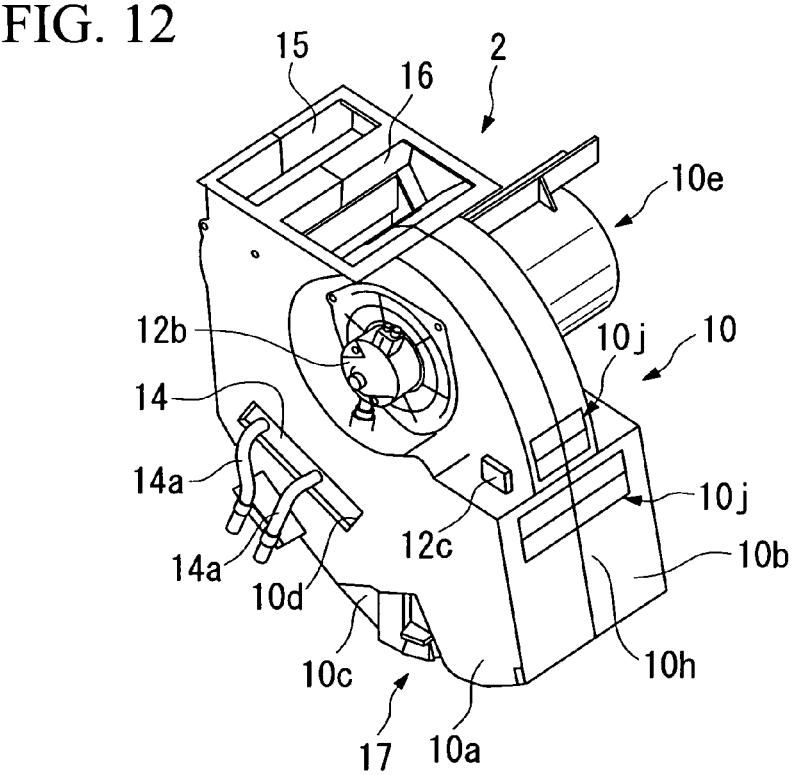
FIG. 12 is a similar view to that of FIG. 11 showing an embodiment wherein the plan view of the shape of the notch differs from that shown in FIG. 11.

In a second embodiment of the present invention, except for the following points, the configuration of the vehicle air-conditioning apparatus is the same as the configuration of the vehicle air-conditioning apparatus of the first embodiment, and a description of the configuration, and its operation and effects common to the first embodiment, is omitted. That is to say, in the vehicle air-conditioning apparatus 1 of the second embodiment, as shown in FIG. 11, either multiple linear notches (or grooves) 10j (seven shown in FIG. 11), or as shown in FIG. 12, a rectangular-shaped (in plan view) notch (or groove) 10j is provided on the surface of the 10h at the rear of the air-conditioning unit 2.

In the vehicle air-conditioning apparatus 1 of the present embodiment, due to the aforementioned configuration, the main case 10 is more easily broken than when no notches 10j are present, when hit by audio equipment in the event of a vehicle collision. Therefore, in addition to the effects of the air-conditioning unit of the first embodiment, this has an effect wherein the distance between the air-conditioning unit 100 and the audio equipment can be further reduced, and the interior space of the vehicle can be further expanded forward.

Third Embodiment

In a third embodiment of the present invention, except for the following points, the configuration of the vehicle air-conditioning apparatus is the same as the configuration of the vehicle air-conditioning apparatus in the first embodiment, and a description of the configuration, and its operation and effects common to the first embodiment, is omitted. That is to say, in the air-conditioning apparatus 1 of the third embodiment, the evaporator 13 is fitted within the main cover 10 with a crushable (i.e. readily breakable or deformable under an impact) material so that it is able to move towards the front of the vehicle (that is to say, to the position indicated by the virtual line (two-dot chain line) in FIG. 13) when an impact force is applied in the event of a vehicle collision.

Furthermore, the refrigerant piping 13a is manufactured of conventional material with a thinner wall thickness, or of a crushable material.

Figure 13:
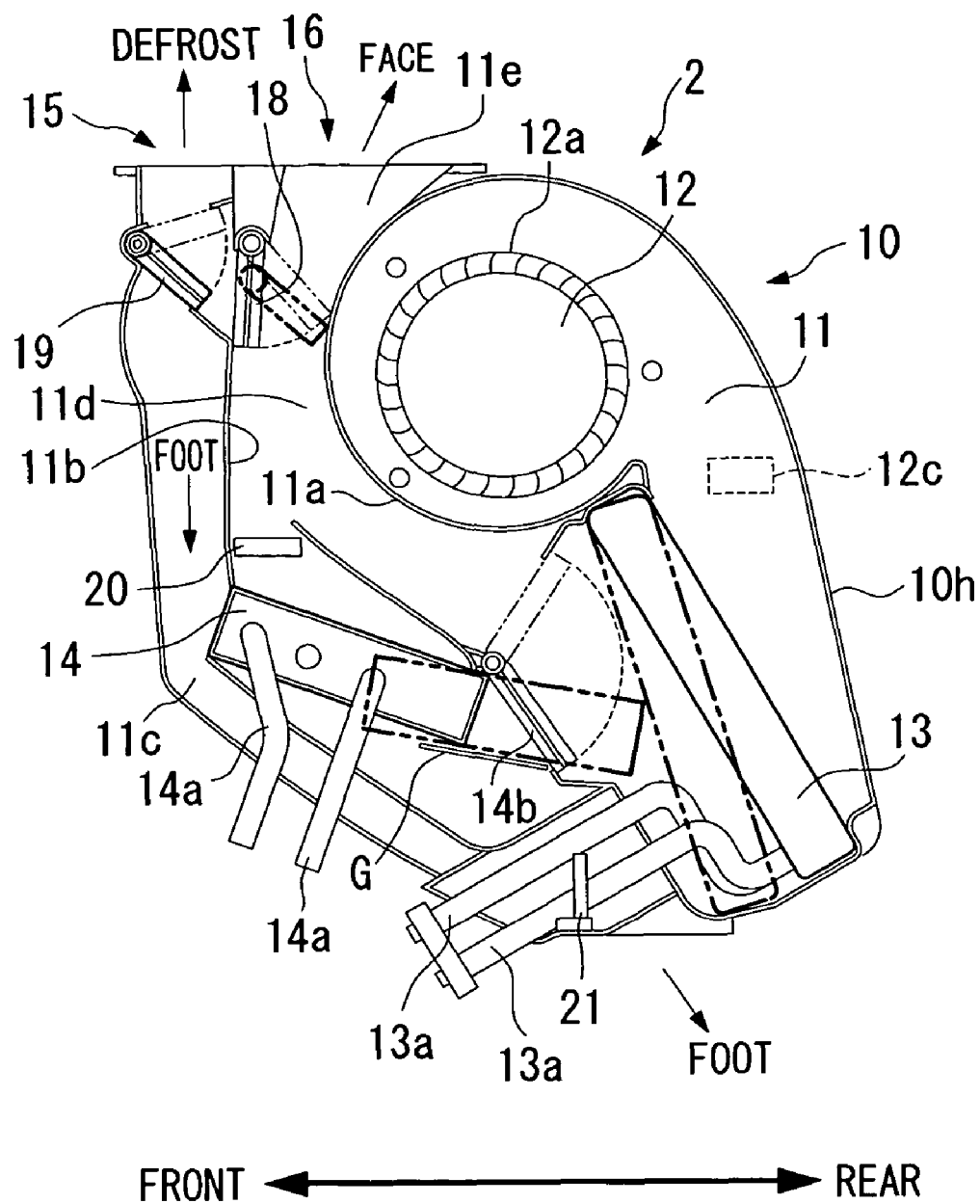
FIG. 13 is a view showing a third embodiment of an air-conditioning unit according to the present invention, being a partial sectional side view showing an aspect of a duct and dampers within the air-conditioning unit.

As with the evaporator 13, the heater core 14 positioned on the downstream side of the evaporator 13 is fitted within the main cover 10 with a crushable (readily breakable or deformable under an impact) material so that it is able to move towards the rear of the vehicle (that is to say, to the position indicated by the virtual line (two-dot chain line) in FIG. 13) when an impact force is applied in the event of a vehicle collision.

Furthermore, on the inner wall surface of the main cover 10 facing both sides of this heater core 14, guide rails G are provided to guide the heater core 14 in the direction of the evaporator 13 through the opening wherein the air mixing damper (component part) 14b described below opens and closes.

The guide rails G are plate-shaped members of the required width, which project from the inner wall surface of the main cover 10 towards the heater core 14. When the heater core 14 moves, the bottom faces on both sides of the heater core 14 move in contact with the top face of the guide rails G, and one end of the heater core 14 (the air mixing damper 14b end) projects from the opening wherein the air mixing damper 14b opens and closes, towards the evaporator 13.

As with the refrigerant piping 13a, the hot water piping 14a is manufactured of a conventional material with a thinner wall thickness, or of a crushable material.

Figure 14:
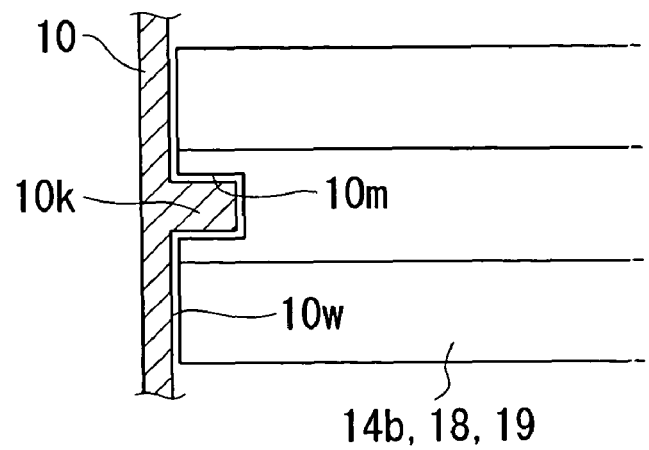
FIG. 14 is an enlarged sectional view of the primary components, showing the damper fitted.
Figure 15:
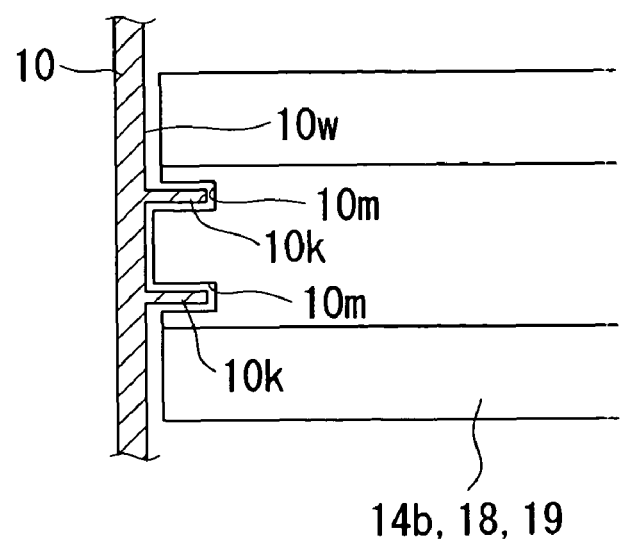
FIG. 15 is an enlarged section view of the primary components, showing the damper fitted in another manner.
Figure 16:
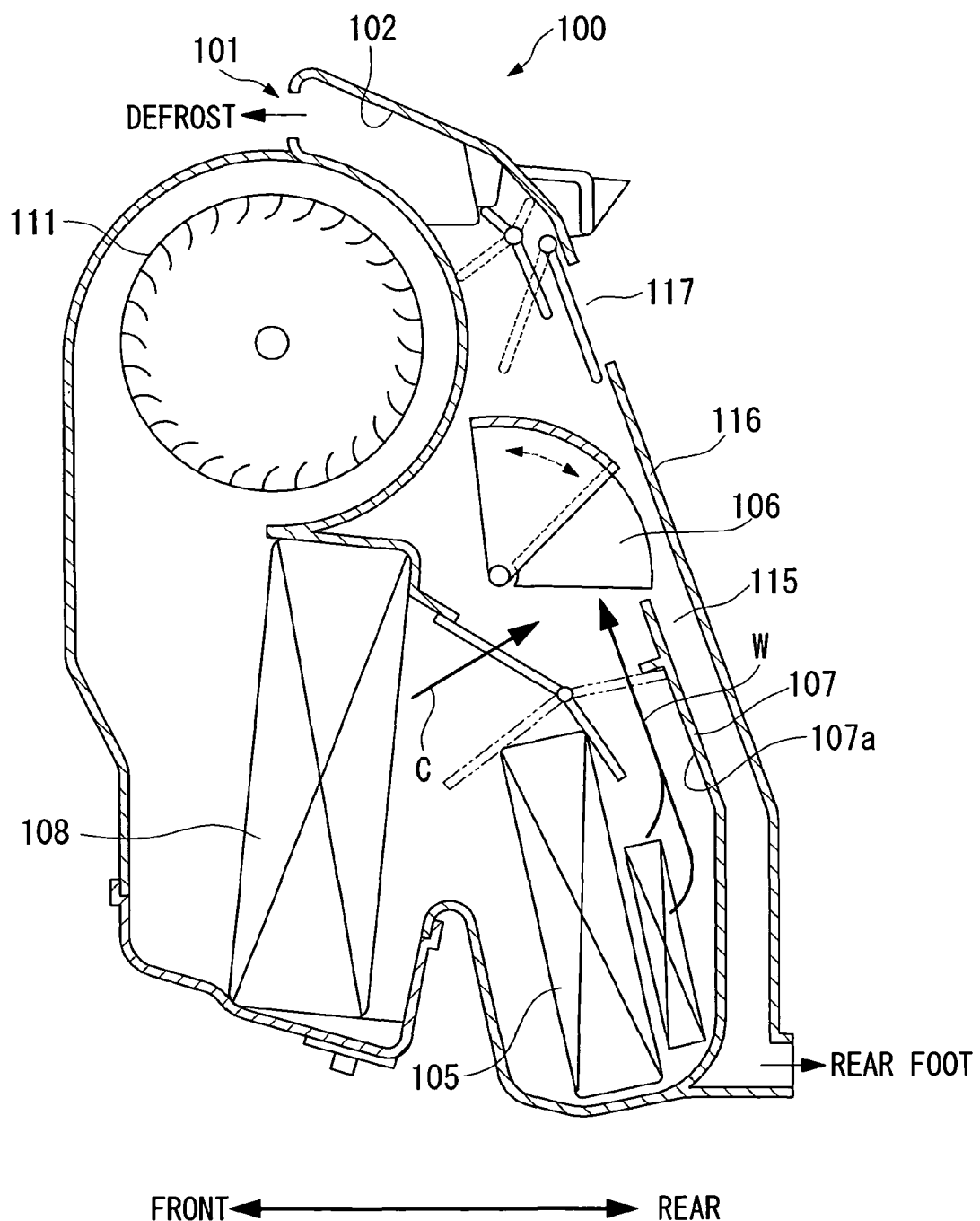
FIG. 16 is a view showing a specific example of a conventional air-conditioning unit, being a partial sectional side view showing an aspect of the duct and dampers within the air-conditioning unit.
Figure 17:
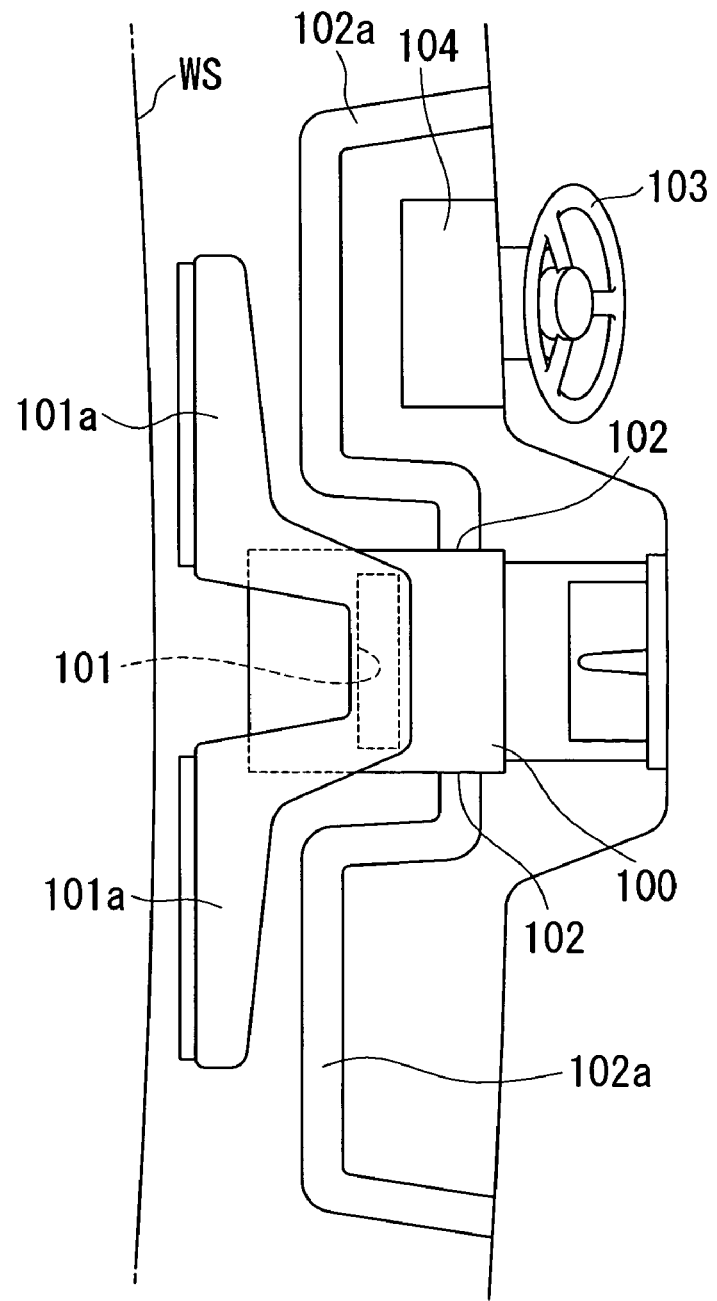
FIG. 17 is a view of the air-conditioning unit shown in FIG. 16 as mounted in a vehicle.

In the present embodiment, the hinges of the dampers 18 and 19, and the air mixing damper 14b (that is to say, the parts fitted to the inner wall surface of the main cover 10 to allow free rotation of these dampers 14b, 18, and 19) described in the first embodiment, are of the configuration as shown in FIG. 14 and FIG. 15.

That is to say, the dampers 14b, 18, and 19 are rotatably fitted to the inner wall surface of the main cover 10, by a convex part 10k projecting from the inner wall surface 10w of the main cover 10 towards the dampers 14b, 18, and 19, and a concave part 10m formed on the end of the dampers 14b, 18, and 19 facing this convex part 10k, so as to receive this convex part 10k.

The convex part 10k shown in FIG. 14 is a columnar member, and the convex member 10m is a tubular hole formed so as to fit with this projection 10k.

Furthermore, the convex part 10k shown in FIG. 15 is a tubular member, and the convex member 10m is a circular groove (in plan view) formed so as to fit with this projection 10k.

As a result, for example, the damper 19 is able to move towards the rear of the vehicle (that is to say, to the position indicated by the virtual line (two-dot chain line) in FIG. 13) through the opening wherein the damper 18 opens and closes, due to an impact force in the event of a vehicle collision.

Further suitability is ensured by provision of a notch (or a thin part) in the wall in the vicinity of the base of the convex part 10k shown in FIG. 14 and FIG. 15. Thus removal from the main cover 10 of the dampers 14b, 18, and 19 can be more readily achieved.

In this manner, under an impact in the event of a vehicle collision, component parts such as the evaporator 13, the heater core 14, and the dampers 14a, 18, and 19, housed within the main cover 10 are separated from the main cover due to the impact force, so that the rigidity of the entire air-conditioning unit 2 is reduced. Therefore, in the event of a vehicle collision, the air-conditioning unit 2 can be crushed particularly in the longitudinal direction of the vehicle (for example, to approximately two thirds of the original dimension) and broken, and collision safety of the vehicle can be improved.

As explained above, since the air-conditioning unit 2 itself can be crushed and broken, deformation of the vehicle parts securing the airbag, and the like (for example, cross beams and columns), can be prevented, the direction in which the airbag is expanded can be maintained in the proper direction, and the airbag can be expanded normally.

In the present embodiment, as with the aforementioned second embodiment, further suitability is ensured as shown in FIG. 11 by provision of either multiple linear notches (or grooves) 10*j* (seven shown in FIG. 11), or a rectangular-shaped (in plan view) notch (or groove) 10*j* as shown in FIG. 12, on the surface of the wall 10*h* at the rear of the air-conditioning unit 2.

As a result, the main case 10 is more easily broken than when no notches 10*j* are present, when hit by audio equipment in the event of a vehicle collision.

What is claimed is:

1. An air-conditioning unit for use in a vehicle, said air-conditioning unit comprising:
    a main cover including:
        an air inlet for drawing in external or internal air;
        an air outlet for exhausting air; and
        a duct communicating between said air inlet and said air outlet,
    a blower for causing air to be drawn in from said air inlet and for causing air to be blown out from said air outlet;
    an evaporator for cooling air moved within said duct by said blower;
    a heater core for heating air moved within said duct by said blower;
    a plurality of guide rails projecting from an inner wall of said main cover toward said heater core;
    a damper housed within said main cover; and
    an opening adapted to be opened and closed by said damper,
    wherein said damper is rotatably fitted to said inner wall of said main cover by a hinge including a convex part projecting from said inner wall of said main cover toward said damper, said damper having a concave part configured to receive said convex part,
    wherein said plurality of guide rails are configured to guide said heater core toward said evaporator through said opening during a motion of said heater core relative to said evaporator, and
    wherein said damper is configured to be separated from said main cover so as to reduce a rigidity of said air-conditioning unit.

2. An air-conditioning unit according to claim 1, wherein said evaporator is positioned below and behind said blower, and said heater core is positioned below and in front of said blower.

3. An air-conditioning unit according to claim 1, wherein at least one notch is provided in said main cover.

4. An air-conditioning unit according to claim 1, wherein said main cover comprises a main left cover and a main right cover.

5. A vehicle air-conditioning apparatus comprising:
    said air-conditioning unit of claim 1;
    a refrigeration system comprising:
        a compressor for compressing a gaseous refrigerant;
        a condenser for exchanging heat between the gaseous refrigerant under a high pressure and external air so as to condense the gaseous refrigerant; and
        an expansion valve for converting a high-temperature high-pressure liquid refrigerant into a low-temperature low-pressure liquid refrigerant, to supply the low-temperature and low-pressure liquid refrigerant to said evaporator;
    a heat source system for introducing engine cooling water to said heater core; and
    a control unit for controlling operation of said air-conditioning unit, said refrigeration system and said heat source system.

6. An air-conditioning unit according to claim 1, wherein said damper is adjustable to an intermediate position between fully open and fully closed to adjust said opening.

7. An air-conditioning unit according to claim 1, wherein said damper is adjustable to a fully open position, a fully closed position, and an intermediate position between fully open and fully closed to vary a mixing ratio of air passing through the heater core.

* * * * *